(12) United States Patent
Wu et al.

(10) Patent No.: US 9,356,648 B1
(45) Date of Patent: *May 31, 2016

(54) FREQUENCY OFFSET ACQUISITION FOR WIRELESS COMMUNICATIONS

(71) Applicant: Marvell International Ltd., Hamilton (BM)

(72) Inventors: Songping Wu, Cupertino, CA (US); Quan Zhou, Sunnyvale, CA (US); Daxiao Yu, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 78 days.

This patent is subject to a terminal disclaimer.

(21) Appl. No.: 14/281,012

(22) Filed: May 19, 2014

Related U.S. Application Data

(63) Continuation of application No. 13/004,659, filed on Jan. 11, 2011, now Pat. No. 8,731,029.

(60) Provisional application No. 61/294,428, filed on Jan. 12, 2010.

(51) Int. Cl.
*H04B 1/707* (2011.01)
*H04L 27/26* (2006.01)
*H04B 1/69* (2011.01)

(52) U.S. Cl.
CPC .............. *H04B 1/707* (2013.01); *H04L 27/266* (2013.01); *H04L 27/2655* (2013.01); *H04L 27/2659* (2013.01); *H04L 27/2662* (2013.01); *H04B 1/69* (2013.01)

(58) Field of Classification Search
CPC ...... H04B 1/707; H04B 1/69; H04L 27/2662; H04L 27/2655; H04L 27/266; H04L 27/2659
USPC ......... 375/130, 142, 147, 150, 260, 329, 330, 375/340, 343; 370/350
See application file for complete search history.

(56) References Cited

U.S. PATENT DOCUMENTS

| | | | |
|---|---|---|---|
| 7,532,693 B1 | 5/2009 | Narasimhan | |
| 7,809,083 B1 | 10/2010 | Wu et al. | |
| 2008/0186948 A1* | 8/2008 | Ramaswamy | ...... H04L 27/2656 370/350 |

(Continued)

OTHER PUBLICATIONS

"Information Technology—Telecommunications and information exchange between systems—Local and metropolitan area networks—Specific requirements—Part 11: Wireless LAN Medium Access Control (MAC) and Physical Layer (PHY) specifications", IEEE Std 802.11, 1999, 521 pages.

(Continued)

*Primary Examiner* — Daniel Washburn
*Assistant Examiner* — Eboni Hughes

(57) ABSTRACT

Systems and techniques relating to wireless communications are described. A described technique includes determining a first frequency offset based on a received preamble of a wireless communication signal and a known preamble, the received preamble having been generated based on a spreading sequence and the known preamble, determining a second frequency offset based on the received preamble and the known preamble, and processing at least a portion of the wireless communication signal based on the first frequency offset and the second frequency offset. Determining the first frequency offset can include performing a multi-chip-level differential frequency offset acquisition that uses two or more chips associated with the received preamble. Determining the second frequency offset can include performing a symbol-level differential frequency offset acquisition that uses two or more symbols associated with the received preamble, where each of the two or more symbols are encoded by two or more chips.

24 Claims, 7 Drawing Sheets

(56) References Cited

U.S. PATENT DOCUMENTS

2008/0205492 A1* 8/2008 Gorday .................. H04B 1/707 375/150
2009/0323865 A1 12/2009 Bradley et al.
2010/0040043 A1* 2/2010 Li ....................... H04L 27/2656 370/350

OTHER PUBLICATIONS

"Part II: Wireless LAN Medium Access Control (MAC) and Physical Layer (PHY) specifications: Higher-Speed Physical Layer Extension in the 2.4 GHz Band", IEEE Std. 802.11b, 1999, 96 pages.

Morelli et al., "Feedforward Carrier Frequency Estimation with MSK-Type Signals", Aug. 2008, IEEE Communications Letters, 2(8):235-237, 3 pages.

Schmidl et al., "Robust Frequency and Timing Synchronization for OFDM", Dec. 1997, IEEE Transactions on Communications, 45(12):1613-1621, 9 pages.

Zigbee Alliance, ZigBee/IEEEE 802.15.4 Summary, Sep. 10, 2004, 37 pages.

* cited by examiner

FREQUENCY OFFSET ACQUISITION FOR WIRELESS COMMUNICATIONS

CROSS REFERENCE TO RELATED APPLICATION

This disclosure is a continuation of and the benefit of U.S. application Ser. No. 13/004,659, filed Jan. 11, 2011 and entitled "FREQUENCY OFFSET ACQUISITION FOR WIRELESS COMMUNICATIONS," now U.S. Pat. No. 8,731,029, which claims the benefit of the priority of U.S. Provisional Application Ser. No. 61/294,428, filed Jan. 12, 2010 and entitled "NEW FREQUENCY OFFSET ACQUISITION SCHEME/ARCHITECTURE FOR WIRELESS SYSTEMS," which is incorporated herein by reference in its entirety.

BACKGROUND

This disclosure relates to wireless communication systems.

Wireless communication systems can include multiple wireless communication devices that communicate over one or more wireless channels. Wireless communication systems can use differential receivers to handle incoming wireless communication signals. Differential receivers are popular in a variety of circumstances, such as in wireless local area networks (WLAN, for example, IEEE 802.11) or personal area networks (e.g., Bluetooth®, IEEE 802.15.4, or ZigBee). A typical architecture employs a phase shift keying (PSK) modulation technique such as binary phase-shift keying (BPSK) or differential quadrature phase shift keying (DQPSK). Differential receivers are attractive because of their low cost coupled with good performance and acceptable data transmission rates in the presence of noise. Communication systems suffer, however, from significant performance loss introduced by frequency offset, since it is difficult to accurately extract the data payload from a received signal in the presence of frequency offset.

SUMMARY

The present disclosure includes systems and techniques related to wireless communications.

According to an aspect of the present disclosure, a technique for wireless communications includes receiving information that is indicative of a wireless communication signal transmitted by a wireless communication device, the wireless communication signal having been generated based on a spreading sequence and a known preamble; determining, based on the received information and the known preamble, an estimation of a first frequency offset frequency offset using two or more locations for encoding elements associated with the spreading sequence; determining, based on the received information, the known preamble, and the first frequency offset, an estimation of a second frequency offset using two or more locations for symbols associated with the known preamble, the second frequency offset being different from the first frequency offset; and processing the received information based on a combination of the first frequency offset and the second frequency offset.

The described systems and techniques can be implemented in electronic circuitry, computer hardware, firmware, software, or in combinations of them, such as the structural means disclosed in this specification and structural equivalents thereof. This can include at least one computer-readable medium embodying a program operable to cause one or more data processing apparatus (e.g., a signal processing device including a programmable processor) to perform operations described. Thus, program implementations can be realized from a disclosed method, system, or apparatus, and apparatus implementations can be realized from a disclosed system, computer-readable medium, or method. Similarly, method implementations can be realized from a disclosed system, computer-readable medium, or apparatus, and system implementations can be realized from a disclosed method, computer-readable medium, or apparatus.

For example, one or more disclosed embodiments can be implemented in various systems and apparatus, including, but not limited to, a special purpose data processing apparatus (e.g., a wireless communication device such as a wireless access point, a remote environment monitor, a router, a switch, a computer system component, a medium access unit), a mobile data processing apparatus (e.g., a wireless client, a cellular telephone, a smart phone, a personal digital assistant (PDA), a mobile computer, a digital camera), a general purpose data processing apparatus such as a computer, or combinations of these.

Systems and apparatuses can include circuitry configured to receive information that is indicative of a wireless communication signal transmitted by a wireless communication device, the wireless communication signal having been generated based on a spreading sequence and a known preamble; circuitry configured to determine an estimation of a first frequency offset frequency offset using two or more locations for encoding elements associated with the spreading sequence, where the first frequency offset frequency offset is based on received information and the known preamble; circuitry configured to determine an estimation of a second frequency offset using two or more locations for symbols associated with the known preamble, where the second frequency offset frequency offset is based on (i) the received information, (ii) the known preamble, and (iii) the first frequency offset, where the second frequency offset is different from the first frequency offset; and circuitry configured to process the received information based on a combination of (i) the first frequency offset and (ii) the second frequency offset.

Details of one or more implementations are set forth in the accompanying drawings and the description below. Other features and advantages may be apparent from the description and drawings, and from the claims.

DRAWING DESCRIPTIONS

Like reference symbols in the various drawings indicate like elements.

DETAILED DESCRIPTION

Figure 1:
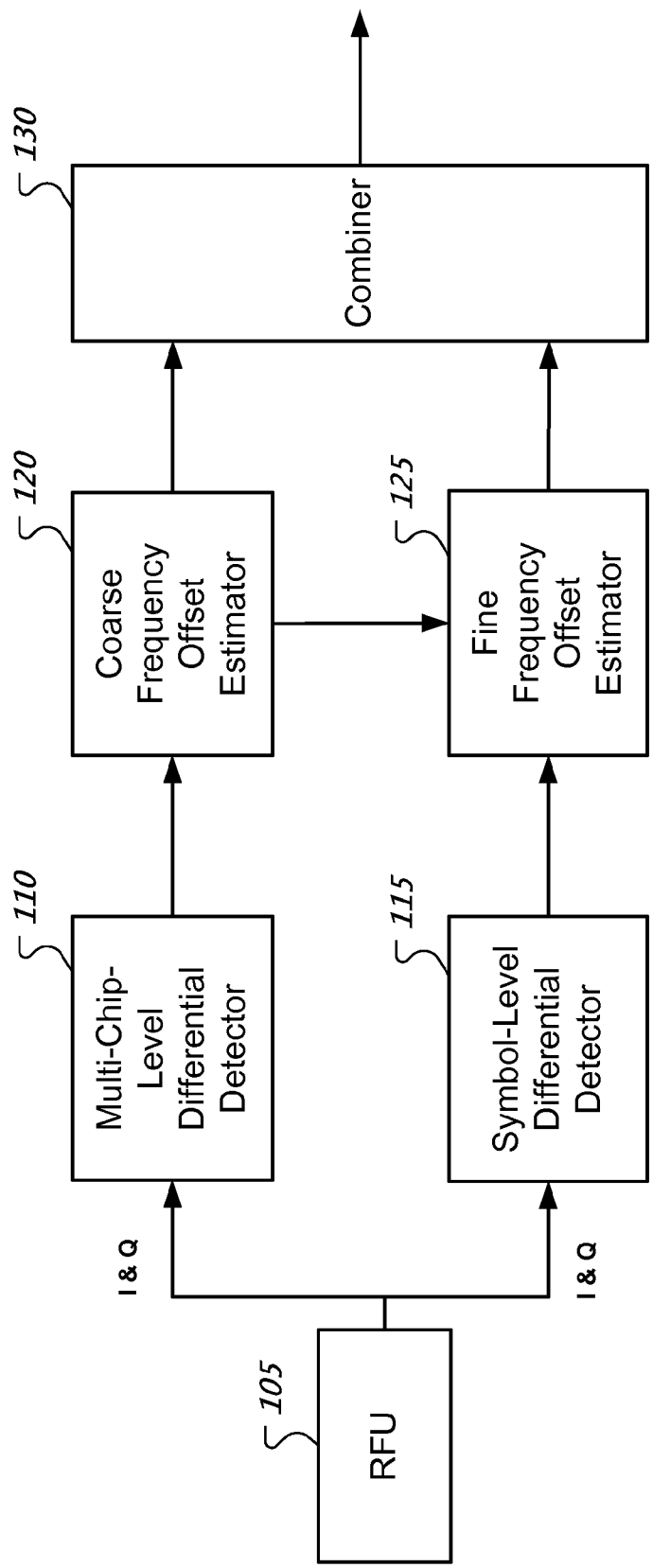
FIG. 1 shows an example of a dual frequency offset estimation architecture.

Wireless communication systems use one or more techniques to compensate for a local oscillator frequency mismatch between transmitting and receiving wireless communication devices. In various communication devices, a transmit data path and a receive data path are both present because these devices communicate with other devices by transmitting and receiving wireless communication signals that are modulated and demodulated at a carrier frequency. A local oscillator signal that is used to demodulate a received signal may differ in frequency from a different local oscillator signal that is used to modulate the signal. Such a difference in local oscillator frequencies can benefit from compensation to properly extract data encoded by a received signal.

This disclosure provides details and examples of technologies for wireless communications, including carrier frequency offset estimation techniques. A wireless communication device can use a described estimation technique such as a dual layer frequency offset estimation technique to provide solutions in terms of both estimation range and accuracy, where the dual layers use samples from the same received communication preamble. Potential advantages of one or more of the described estimation techniques include increased estimation range, increased accuracy, or both. For example, one or more of the described techniques provide increased performance with very low signal to noise ratios (e.g., at or around 2 dB). One or more of the described techniques provide compensation for a frequency offset that is greater than a bit rate of a communication signal. The techniques and architectures presented herein can be implemented in a variety of wireless communication systems such as ones based on ZigBee, WLAN (e.g., a network based on an IEEE 802.11 standard), Bluetooth®, and Worldwide Interoperability for Microwave Access (WiMAX).

In a dual layer frequency offset acquisition (FOA) technique, frequency offset acquisition is performed on a preamble portion of a received signal and includes a coarse FOA and a fine FOA. A coarse FOA can perform a multi-chip-level acquisition to determine a frequency offset. In some implementations, coarse FOA occurs concurrently with code synchronization, and can be a byproduct of a code synchronization correlation. The phase of a correlation hit can be a linear function of a frequency offset. In coarse FOA, a multi-chip-level differential FOA can provide improvements on the range of FOA residual error when compared to a single-chip-level differential FOA. In fine FOA, a symbol-level differential FOA is used to improve the resolution of the coarse frequency offset estimation, e.g., refine the estimation accuracy within a limited range. Fine FOA can reuse the same preamble used by the coarse FOA. In some implementations, fine FOA can occur after coarse FOA. The dual layer frequency offset acquisition (FOA) technique can provide improved estimation SNR with increased differential distance. Performing coarse FOA and fine FOA can provide enhanced solutions for estimation range and accuracy.

FIG. 1 shows an example of a dual frequency offset estimation architecture. A radio frequency unit (RFU) 105 in a wireless communication device converts a received radio frequency (RF) signal into a baseband (BB) signal based on a demodulation process that uses a signal from a local oscillator (LO) included in the RFU 105. For example, the RFU 105 down-converts a received RF signal to a baseband signal. The baseband signal contains an in-phase component (denoted as "I") and a quadrature phase component (denoted as "Q"). In this estimation architecture, the RFU 105 provides a baseband signal to two or more frequency offset estimation pathways, e.g., coarse and fine. The frequency offset estimation pathways determine a frequency offset between the transmitting device's local oscillator and the receiving device's local oscillator.

The RFU 105 can receive a RF signal that is based on one or more spreading sequences. A spreading sequence is used to spread a data bit over two or more encoding elements. In some implementations, a spreading sequence is based on Direct Sequence Spread Spectrum (DSSS). In DSSS, the encoding elements are called chips and each symbol is encoded based on two or more chips. For example, a symbol "1" can be represented by a 7-chip {1110001}, and a symbol "0" can be represented by a 7-chip {0001110}. This can be interpreted as a form of coding. In a multi-chip-level frequency offset acquisition, a differential operation is based on one or more chips within one symbol, e.g., within {1110001}. A differential distance for chip-level acquisition can be less than 7 chips. In a symbol-level frequency offset acquisition, the differential operation is based on a symbol distance. For example, a differential distance for symbol-level acquisition can be 7 chips, which equals one symbol. Other distances are possible, such as a 14-chip, which equals two symbols. Other quantities of chips are possible for coding a symbol, e.g., 15-chip for IEEE 802.11b, or 1023-chip for Global Positioning System (GPS).

A coarse frequency estimation pathway, in the wireless communication device, includes a multi-chip-level differential detector 110 and a coarse frequency offset estimator 120. The multi-chip-level differential detector 110 processes a baseband signal at a chip-level by applying differential detection to the baseband signal using a multi-chip-level differential length, e.g., a chip length that does not span a full symbol, which is greater than one chip. A coarse frequency offset estimator 120 can include a correlator to determine a correlation based on output from the multi-chip-level differential detector 110 and a known preamble. The coarse frequency offset estimator 120 can include a maximum search value engine to identify a sample index that provides a maximum valued correlation with a known preamble within a predetermined window of samples.

A fine frequency estimation pathway, in the wireless communication device, includes a symbol-level differential detector 115 and a fine frequency offset estimator 125. The symbol-level differential detector 115 processes a baseband signal at a symbol-level by applying differential detection to the baseband signal using a symbol-level differential length, e.g., a chip length that spans at least a full symbol. A fine frequency offset estimator 125 can include a symbol-level correlator to determine a correlation based on output from the symbol-level differential detector 115 and a known preamble. The fine frequency offset estimator 125 can use a sample time index output from the coarse frequency offset estimator 120 to isolate a value produced by the symbol-level correlator. The fine frequency offset estimator 125 can produce a frequency offset correction value based on the isolated value.

In some implementations, a fine frequency offset estimator 125 uses a sample time index output from the coarse frequency offset estimator 120 to reduce the range of sample indices that the fine frequency offset estimator 125 has to consider in a maximum value search. A fine frequency offset estimator 125 can include a maximum likelihood estimator configured to determine a sample time index that is separate from the time index produced by the coarse frequency offset estimator 120.

Outputs of the coarse frequency offset estimator 120 and the fine frequency offset estimator 125 are combined via a combiner 130. In some implementations, a combiner 130 uses an adder to combine. In some implementations, a combiner 130 subtracts a version of an output of the coarse frequency offset estimator 120 from an output of the fine frequency offset estimator 125. The elements depicted by FIG. 1 can be implemented in one or more integrated circuits included in a wireless communication device.

Figure 2:
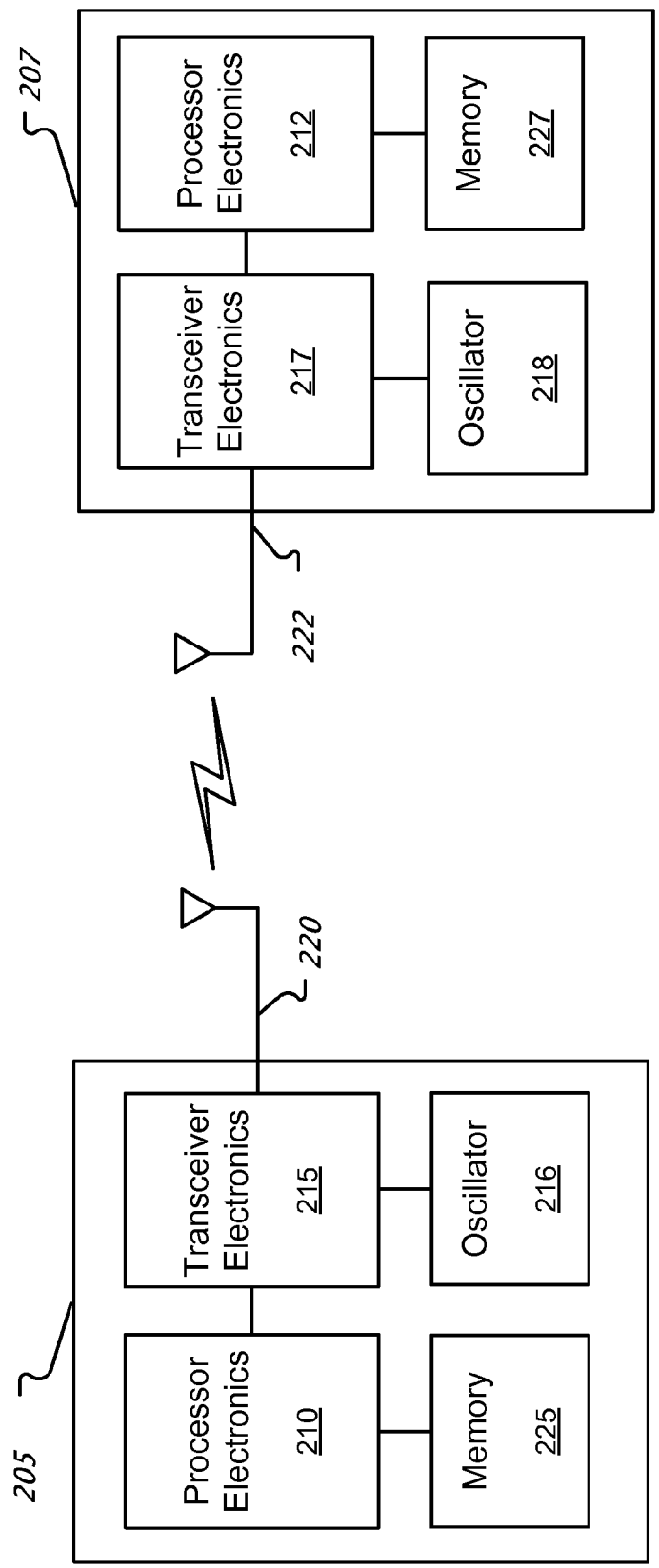
FIG. 2 shows an example of a wireless network with two wireless communication devices.

FIG. 2 shows an example of a wireless network with two wireless communication devices. Various examples of wireless communication devices include mobile phones, smart phones, wireless routers, wireless hubs, base stations, and access points. In some cases, wireless communication electronics are integrated with data processing equipment such as laptops, personal digital assistants, and computers. Wireless communication devices 205, 207 such as an access point (AP), base station (BS), wireless headset, access terminal (AT), client station, or mobile station (MS) can include circuitry such as processor electronics 210, 212 and transceiver electronics 215, 217. Processor electronics 210, 212 can include one or more processors that implement one or more techniques presented in this disclosure. Coupled with the processor electronics 210, 212, wireless communication devices 205, 207 include one or more memories 225, 227 configured to store information such as data, instructions, or both. In some implementations, the instructions include instructions for estimating a carrier frequency offset.

Wireless communication devices 205, 207 include circuitry such as transceiver electronics 215, 217 to send and receive wireless signals over one or more antennas 220, 222. In some implementations, transceiver electronics 215, 217 include integrated transmitting and receiving circuitry. In some other implementations, wireless communication devices 205, 207 include dedicated circuitry for transmitting and dedicated circuitry for receiving. For transmitting, transceiver electronics 215, 217 use oscillators 216, 218 to modulate a baseband signal into a RF signal. For receiving, transceiver electronics 215, 217 use an oscillator 216, 218 to demodulate a RF signal into a baseband signal. Potential frequency differences between the transmitting and receiving oscillators 216, 218 can introduce errors in the processing of a received wireless communication signal.

At a receiving device 207, an RF signal encoding a data payload passes through an antenna 222 that is coupled with transceiver electronics 217 that are configured to extract an in-phase component and a quadrature phase component from the RF signal. These components are respectively sampled by a pair of analog-to-digital converters (ADC). For an I-channel, the transceiver electronics 217 down-converts the RF signal to an in-phase baseband signal via demodulating the RF signal using a cosine function and a version of a signal generated by the oscillator 218. For a Q-channel, the transceiver electronics 217 down-converts the RF signal to a quadrature baseband signal via demodulating the RF signal using a sine function and a signal generated by the oscillator 218. The in-phase signal and the quadrature signal can be respectively filtered by low-pass filters to eliminate adjacent channel interference. The low-pass filters can provide the in-phase signal and the quadrature signal to two or more differential detectors.

In the presence of noise, a received signal r(t) is equal to a transmitted signal x(t) plus a noise component w(t), that is r(t)=x(t)+w(t). In this case, $$\sum_{i=1}^{N} r(t)x^*(t) = N + \sum_{i=1}^{N} w(t).$$

However, based on differences among oscillators 216, 218 in different communication devices 205, 207, r(t) is expressed as:

$r(t)=x(t)e^{j2\pi t \Delta f}+w(t).$

In this equation, Δf represents a frequency offset.

Figure 3:
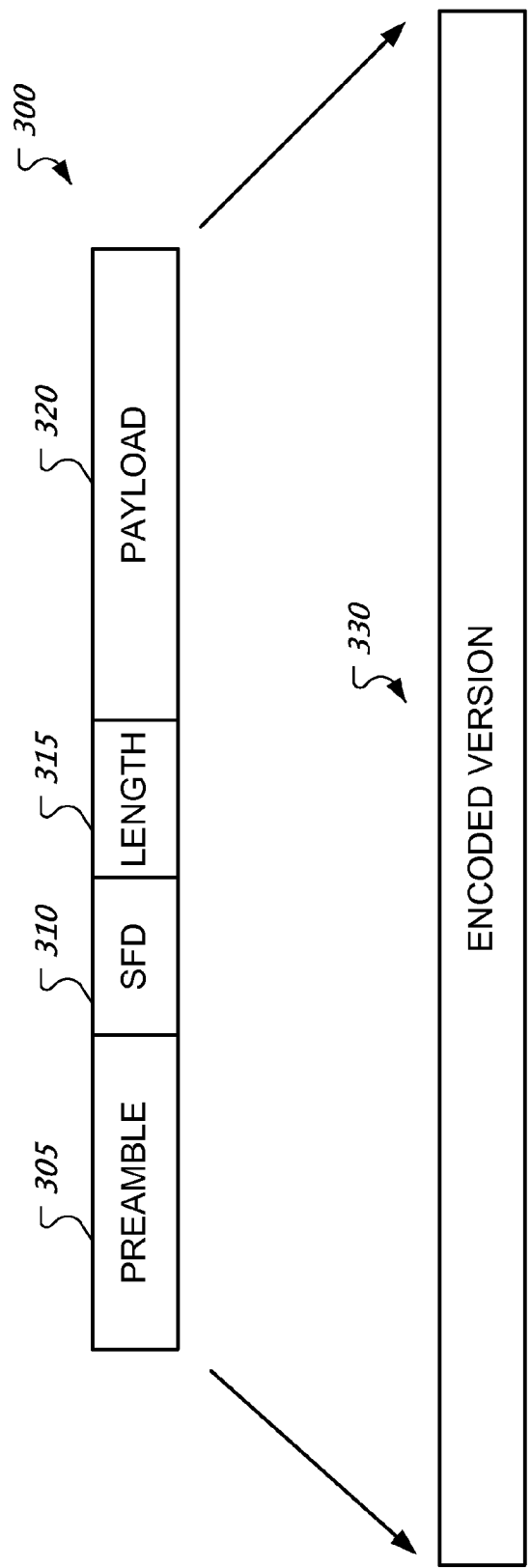
FIG. 3 shows an example of a relationship between a packet and an encoded version of the packet.

FIG. 3 shows an example of a relationship between a packet and an encoded version of the packet. A device can encode a packet for transmission to a recipient device. A packet 300 includes a preamble 305, a Start of Frame Delimiter (SFD) 310, a length field 315, and a payload 320. The length field 315 can be divided into a 7-bit frame length field and a 1-bit reserved field. A spreading process can spread the data bits of the packet 300 over multiple bits to form an encoded version 330 of the packet 300. In some implementations, a spreading process uses a DSSS spreading process. In some implementations, a preamble field 305 is composed of 32 binary zero bits (e.g., 8 symbols/repetitions with a 32-chip sequence). A device can use the preamble field 305 to obtain chip and symbol synchronization for an incoming message. The device can use the preamble field 305 for frequency offset acquisition.

Figure 4:
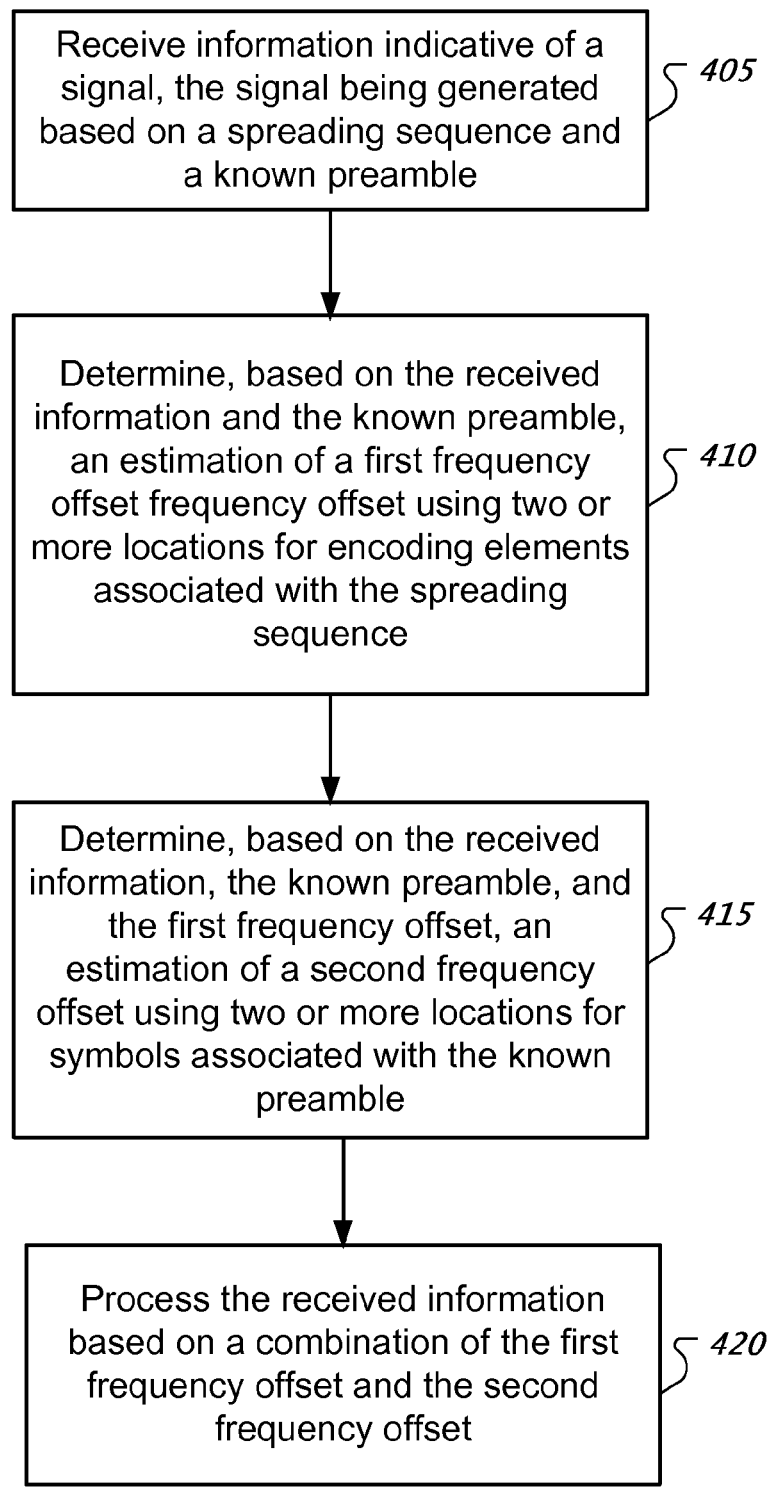
FIG. 4 shows an example of a communication process based on a dual frequency offset estimation architecture.

FIG. 4 shows an example of a communication process based on a dual frequency offset estimation architecture. A receiving device can implement a communication process based on a dual frequency offset estimation architecture. At 405, the communication process receives information indicative of a signal, the signal being generated based on a spreading sequence and a known preamble. In this example, a transmitting device uses the spreading sequence to generate the wireless communication signal. In some implementations, a known preamble is based on a known pattern such as a sequence of zeros. Receiving information can include receiving data samples from two or more ADCs that are sampling different components of a baseband communication signal. Data samples can include real and imaginary elements.

At 410, the communication process determines, based on the received information and the known preamble, an estimation of a first frequency offset frequency offset using two or more locations for encoding elements locations associated with the spreading sequence. A location can correspond to a sample index. Determining an estimation of a first frequency offset can include using an output of a first differential detector configured based on a first differential length. Using two or more locations for encoding elements can include use a differential length that spans two or more encoding elements. Determining an estimation of a first frequency offset can include using received samples that correspond to a portion of the received information.

At 415, the communication process determines, based on the received information, the known preamble, and the first frequency offset, an estimation of a second frequency offset using two or more locations for symbols associated with the known preamble. For example, the two or more locations can correspond to two or more sample indices of two or more respective symbols. The second frequency offset is different from the first frequency offset. Determining an estimation of a second frequency offset can include using an output of a second differential detector configured based on a second differential length. The second differential length can be greater than the first differential length. Using two or more locations for symbols associated with the known preamble can include using a differential length that spans at least a full symbol.

The communication process, at 420, processes the received information based on a combination of the first frequency offset and the second frequency offset. In some implementations, processing the received information can use additional frequency offsets such as a third frequency offset based on a refinement of the second frequency offset. The communication process can apply a compensator factor to a received signal based on the combination of the first frequency offset and the second frequency offset. In some implementations, processing received information can include adjusting the received samples based on the combination to compensate for a frequency offset that is greater than a bit rate of the wireless communication signal.

Determining an estimation of a first frequency offset can include performing a first differential detection based on at least a portion of the received samples using a first differential distance to produce first differential output values. Determining an estimation of a first frequency offset can include performing a first correlation based on values corresponding to a known preamble and first differential output values. Determining an estimation of a second frequency offset can include performing a second differential detection based on at least a portion of the received samples using a second differential distance to produce second differential output values. Determining an estimation of a second frequency offset can include performing a second correlation based on values corresponding to a known preamble and the second differential output values. The second differential distance is greater than the first differential distance.

Determining the estimation of the first frequency offset can include performing a maximum search based on output values of the first correlation. Determining the estimation of the first frequency offset can include determining a sample time index based on the maximum search. Determining the estimation of the second frequency offset can include using the sample time index to access a value that is based on an output of the second correlation. Determining the estimation of the second frequency offset can include estimating the second frequency offset based on the accessed value.

In some implementations, a device can determine an estimation of additional frequency offsets based on the received information. Additional frequency offsets can be estimated based on one or more additional techniques. For example, the device can determine a third frequency offset, which is different from the first frequency offset and the second frequency. The device can combine three or more frequency offsets to compensate for a frequency offset.

One or more described techniques can be used to compensate for large frequency offsets such as 80 ppm or 192 kHz. One or more described techniques can compensate for a frequency offset that is 3 times or more than a symbol rate ($F_{sym}$) associated with a wireless communication signal. In some implementations, $F_{sym}$ is 62.5 kilo-symbols-per-second (ksps). One or more described techniques can compensate for a frequency offset that is within a same magnitude as a bit rate associated with a wireless communication signal. In some implementations, the bit rate is 250 kilobits-per-second (kbps). One or more described techniques can compensate for a frequency offset that is approximately one-tenth of a chip rate, e.g., a chip rate of 2 Mega-chips-per-second (Mcps).

Frequency offset estimation architectures are guided based on estimated signal to noise ratio (SNR) of their respective wireless communication systems and operating environments. A wireless communication device can determine a signal to noise ratio based on received data. The device can determine a SNR based on the following:

$$e^{j\hat{\phi}} = e^{j\phi} + \sqrt{\frac{N_o}{E_s}} n$$

where $n = n_r + j n_i$ denoting a complex normal distribution, $E_s$ is a signal energy per symbol, $N_o$ is a noise power spectral density, $\phi$ represents a phase difference, and $\hat{\phi}$ represents an estimated phase difference. A frequency offset is given by $$\Delta f = \frac{\phi}{2\pi T_{sp}}$$

where $T_{sp}$ represents a differential distance in time for frequency offset estimation such as a carrier frequency offset (CFO) estimation. An estimated frequency offset is given by $$\Delta f = \frac{\hat{\phi}}{2\pi T_{sp}}.$$

The difference between $\hat{\phi}$ and $\phi$ is called a residual error. The difference can be expressed as:

$$e^{j(\hat{\phi} - \phi)} = 1 + \sqrt{\frac{N_o}{E_s}} n.$$

Based on a residual error being small, meaning the residual error goes down to a few percent or less of the true value, the difference can be approximated based on $$\delta\phi = \hat{\phi} - \phi \cong \sqrt{\frac{N_o}{E_s}} n_i.$$

It follows that $$\hat{\phi} \cong \phi + \sqrt{\frac{N_o}{E_s}} n_i.$$

An estimated SNR (estSNR) can be expressed as:

$$estSNR = \frac{E[|\phi|^2]}{E\left[\left|\sqrt{\frac{N_o}{E_s}} n_i\right|^2\right]} = \frac{2E_s}{N_o} [|\phi|^2]$$

It follows that $$estSNR = \frac{2E_s}{N_o} E[|2\pi T_{sp} f_{cfo}|^2] = \frac{2E_s}{N_o} (2\pi T_{sp})^2 E[|f_{cfo}|^2].$$

where $T_{sp}$ represents a differential distance in time for CFO estimation. The differential distance can be based on an integer multiple of a time epoch $T_c$.

Figure 5:
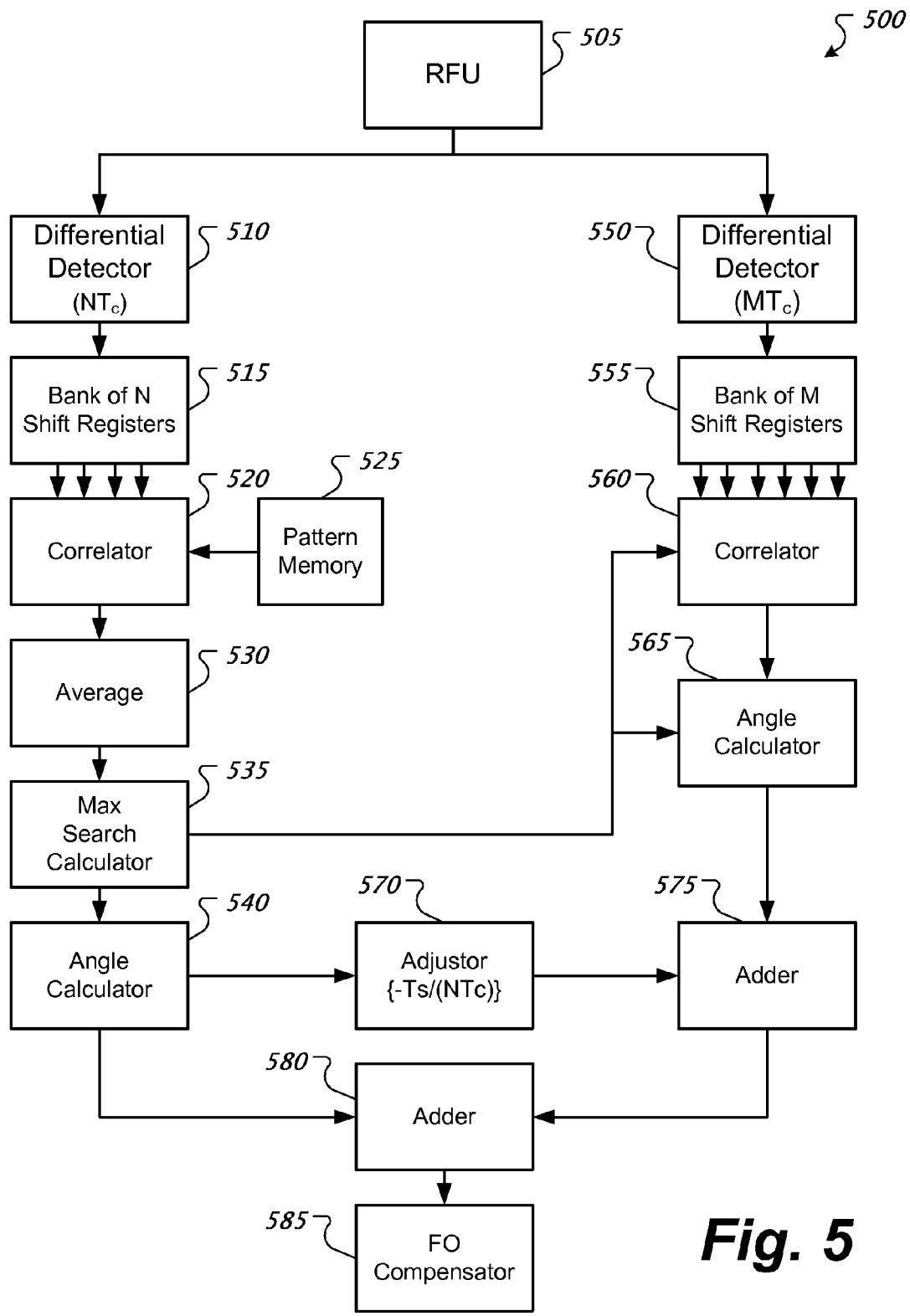
FIG. 5 shows another example of a dual frequency offset estimation architecture.

FIG. 5 shows another example of a dual frequency offset estimation architecture. A wireless device 500, based on a dual frequency offset estimation architecture, can include a RF unit (RFU) 505 that is configured to convert a RF signal into a baseband signal, s(n), using a signal from a local oscillator, and provide the baseband signal to two or more frequency offset estimation pathways, e.g., coarse and fine.

In a coarse frequency offset estimation pathway, a first differential detector 510 applies differential detection to the baseband signal, s(n), using a differential length of $NT_c$, to obtain a correspondingly demodulated baseband signal, which is potentially corrupted by one or more frequency offsets. In some implementations, such as one based on IEEE 802.15.4, N can be 3 and $T_c$ can be 0.5 microseconds. Other values for N and $T_c$ are possible, and can vary among different implementations. Various examples of a demodulated baseband signal include a demodulated BPSK signal and a demodulated DQPSK signal. Other types of demodulated baseband signals are possible. Outputs of the first differential detection 510 can be expressed as:

$$d(n)=s(n)s^*(n-N)e^{j\phi_1}$$

where $\phi_1=2\pi NT_c\Delta f_1$, and $\Delta f_1$ represents a fine frequency offset.

A bank of N shift registers 515 stores the last N outputs of the first differential detection 510. For each time epoch $T_c$, the shift registers 515 pass their content to an adjacent register to make room for a new value produced by the first differential detection 510. Note that the last shift register 515 need not provide an output for its content, thereby discarding its previously stored value.

The wireless device 500 uses a first correlator 520, of a coarse frequency offset estimation pathway, to determine a time index based on matching stored differential output with a known pattern. The first correlator 520 can perform a correlation based on the values stored by the bank of N shift registers 515 and values of a known pattern, e.g., a preamble. The first correlator 520 can retrieve known pattern values from a pattern memory 525. Output of the first correlator 520 can be expressed as:

$$c(n)=\sum_{k=1}^{N-1} d(n-k)[s(n)s^*(n-N)]^* + \text{noise}$$

The coarse correlation output is averaged by an averaging block 530 at each time epoch to form an averaged sequence whose maximum value is found. An averaging block 530 can smooth out the output values from the first correlator 520 in an averaging window. In some implementations, an averaging window can have a length of 5. Other length values are possible. The output of the averaging block 530 can be expressed as $$a(n)=\begin{cases} Ne^{j\phi_1} + \text{noise} & \text{if matched with pattern} \\ \text{interference} + \text{noise} & \text{if not matched} \end{cases}$$

A max search calculator 535 determines a time index into a sequence that maximizes the absolute value of the function a(n) over that sequence. The output of the max search calculator 535 indicates a match with a known pattern. In some implementations, a max search calculator 535 uses a maximum likelihood estimator that is operated on the output of the averaging block 530. The max search calculator 535 can perform a comparison based on the sequence value at the determined time index and a threshold to confirm that the maximum value result is valid. The maximum value is a complex number. In some implementations, the max search calculator 535 can iterate through time index values determining whether max{abs(a(n))}>threshold is true for each value.

The phase associated with the maximum value provides the coarse frequency offset estimation. An angle calculator 540 can extract a phase from the maximum value using an arctangent of a value based on the real component and the imaginary component of the maximum value.

A second differential detector 550, in a fine frequency offset estimation pathway, applies differential detection to the baseband signal, s(n), using a differential length of $MT_c$, to obtain a correspondingly demodulated baseband signal, such as a demodulated PSK signal (e.g., a demodulated DQPSK signal), which is potentially corrupted by one or more frequency offsets. The value of M used for fine estimation is greater than the value of N used for coarse estimation. Outputs of the second differential detection 550 can be expressed as:

$$d(n)=s(n)s^*(n-M)e^{j\phi_2}$$

where $\phi_2=2\pi MT_c\Delta f_2$, and $\Delta f_2$ represents a fine frequency offset.

A bank of M shift registers 555 stores the last M outputs of the second differential detector 550. For each time epoch $T_c$, the shift registers 555 pass their content to an adjacent register to make room for a new value produced by the second differential detector 550. Note that the last shift register 555 need not provide an output for its content, thereby discarding its previously stored value.

The wireless device 500 matches stored differential output of the second differential detection 550 with a known pattern using a second correlator 560 in a fine frequency offset estimation pathway. The correlator 560 can perform a correlation based on the values stored by the bank of M shift registers 555 and values of a known pattern, e.g., a preamble. In some implementations, the known pattern for fine estimation is different from the known pattern used for coarse estimation. The second correlator 560 can retrieve known pattern values from a pattern memory (not shown). In some implementations, the second correlator 560 can retrieve known pattern values from a pattern memory 525 supplying values to the first correlator 520. Output of the second correlator 560 can be expressed as:

$$c(n)=\sum_{k=0}^{N-1} d(n-k)[s(n)s^*(n-M)]^* + \text{noise}$$

In some implementations, fine correlation output is averaged by an averaging block at each time epoch to form an averaged sequence. In some implementations, the second correlator 560 uses a time index supplied by the max search calculator 535 of the coarse estimation.

An angle calculator 565, for the fine estimation, can use the time index supplied by the max search calculator 535 of the coarse estimation to retrieve a sequence value from a sequence produced by the second correlator 560. The angle calculator 565 can extract a phase from the sequence value using an arctangent of a value based on the real component and the imaginary component of the sequence value. The phase associated with the sequence value provides the fine frequency offset estimation.

An adjustor 570 multiples the output of the angle calculator 540 for the course estimation by $-T_s/(NT_c)$ to produce the adjusted version. In some implementations, such as one based on IEEE 802.15.4, $T_s$ is 16 microseconds. A first adder 575 sums the output of the angle calculator 565 for the fine estimation with an adjusted version of the output of the angle calculator 540 for the course estimation. A second adder 580 sums the output of the first adder 575 with the output of the angle calculator 540 for the course estimation. A frequency offset compensator 585 determines a frequency offset based on the output of the second adder 580 and applies frequency offset correction to the baseband signal to compensate for the frequency offset.

Figure 6:
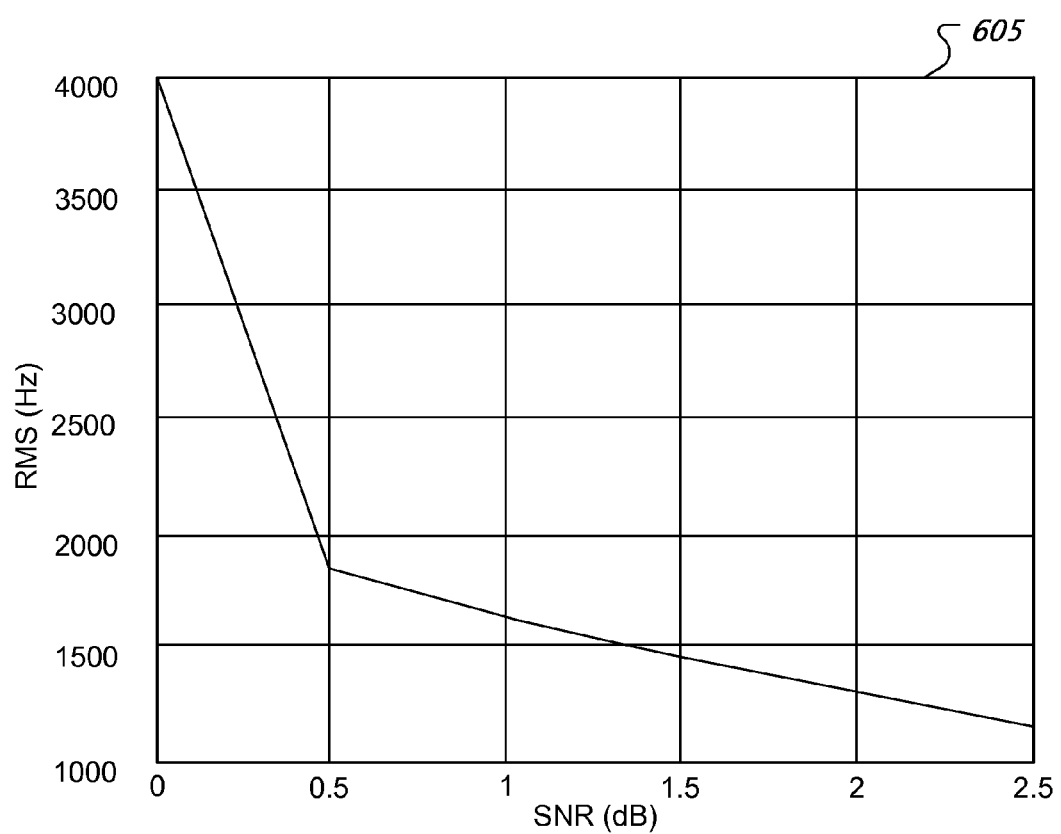
FIG. 6 shows an example of a performance based graph of a described dual estimation technique.

FIG. 6 shows an example of a performance based graph of a described dual estimation technique. The graph 605 shows the performance of a described dual estimation technique in a simulation where the frequency offset is 200 kHz. The absolute root mean-squared-error (MSE) is given on the y axis using units of Hz. The SNR is given on the x axis using units of dB and is based on a $E_s/N_o$ ratio. As shown by the graph 605, with an operating SNR of 1.5 dB or higher, the described technique achieves an estimation accuracy that is better than 1.5 kHz (e.g., less than 1.5 kHz).

Figure 7:
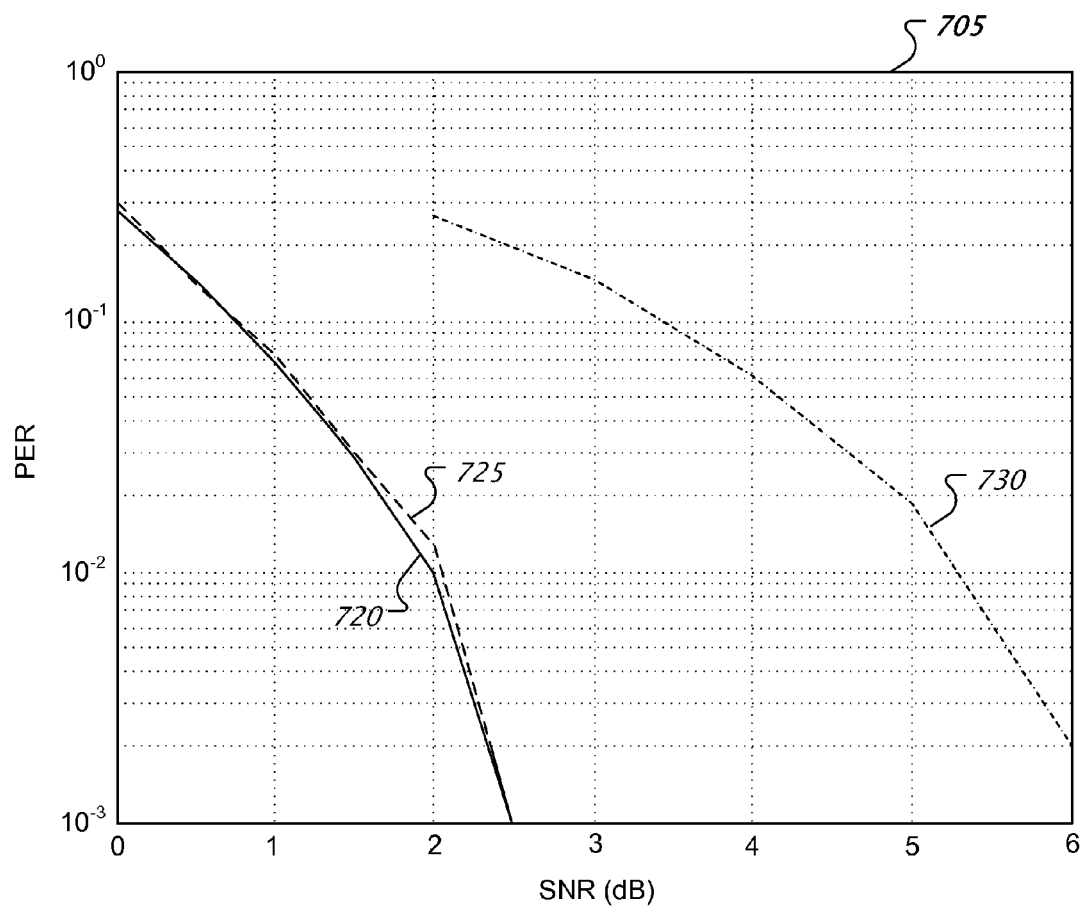
FIG. 7 shows another example of a performance based graph of a described dual estimation technique.

FIG. 7 shows another example of a performance based graph of a described dual estimation technique. Based on packet error rate (PER) simulation using shaped-offset QPSK (SOQPSK) modulation, the graph 705 shows the performance 720 of an ideal case, with no carrier frequency offset, the performance 725 of a described dual estimation technique in the presence of a CFO of 200 kHz, and the performance 730 of a conventional technique in the presence of a CFO of 200 kHz. The conventional technique is based on single chip comparisons (e.g., chip-level differential blind estimation for MSK type of signals), whereas the described dual estimation technique is based on multi-chip comparisons. The PER is given on the y axis using units of Hz. The SNR is given on the x axis using units of dB. As shown by the graph 705, the performance 725 of the described technique provides a 3 dB improvement over the performance 730 of the conventional chip-level scheme. The performance 725 of the described technique shows almost no loss at PER=0.01 when compared with the ideal case.

A few embodiments have been described in detail above, and various modifications are possible. The disclosed subject matter, including the functional operations described in this specification, can be implemented in electronic circuitry, computer hardware, firmware, software, or in combinations of them, such as the structural means disclosed in this specification and structural equivalents thereof, including potentially a program operable to cause one or more data processing apparatus to perform the operations described (such as a program encoded in a computer-readable medium, which can be a memory device, a storage device, a machine-readable storage substrate, or other physical, machine-readable medium, or a combination of one or more of them).

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A program (also known as a computer program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A program can be deployed to be executed on one computer or on multiple computers that are located at one site or distributed across multiple sites and interconnected by a communication network.

While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A method comprising:
   determining a first frequency offset based on a received preamble of a wireless communication signal and a known preamble, the received preamble having been generated based on a spreading sequence and the known preamble, wherein determining the first frequency offset comprises performing a multi-chip-level differential frequency offset acquisition that uses two or more chips associated with the received preamble;
   determining a second frequency offset based on the received preamble and the known preamble, wherein determining the second frequency offset comprises performing a symbol-level differential frequency offset acquisition that uses two or more symbols associated with the received preamble, wherein each of the two or more symbols are encoded by two or more chips; and
   processing at least a portion of the wireless communication signal based on the first frequency offset and the second frequency offset.

2. The method of claim 1, wherein determining the first frequency offset comprises performing a first differential detection based on a first differential distance, and wherein determining the second frequency offset comprises performing a second differential detection based on a second differential distance, wherein the first differential distance is greater than one chip but less than a full symbol length, and wherein the second differential distance is greater than the first differential distance.

3. The method of claim 1, wherein the second frequency offset is based on the first frequency offset.

4. The method of claim 1, comprising:
   determining an additional frequency offset based on the received preamble, wherein the additional frequency offset is different from the first frequency offset and the second frequency offset, and wherein the processing comprises using the first frequency offset, the second frequency offset, and the additional frequency offset.

5. The method of claim 1, wherein determining the first frequency offset comprises (i) performing a first differential detection based on at least a portion of samples corresponding to the received preamble using a first differential distance to produce first differential output values, and (ii) performing a first correlation based on (a) values corresponding to at least a portion of the known preamble and (b) at least a portion of the first differential output values, and wherein determining the second frequency offset comprises (i) performing a second differential detection based on at least a portion of the samples using a second, greater differential distance to produce second differential output values, and (ii) performing a second correlation based on (a) values corresponding to at least a portion of the known preamble and (b) at least a portion of the second differential output values.

6. The method of claim 5, wherein determining the first frequency offset comprises (i) performing a maximum search based on output values of the first correlation, and (ii) determining a sample time index based on the maximum search, and wherein determining the second frequency offset comprises using the sample time index to access a value that is based on an output of the second correlation.

7. The method of claim 1, wherein the known preamble comprises a sequence of zeros.

8. The method of claim 1, wherein the spreading sequence is a Direct Sequence Spread Spectrum (DSSS) spreading sequence.

9. An apparatus comprising:
first circuitry configured to access a received preamble of a received wireless communication signal, wherein the received preamble is based on a spreading sequence and a known preamble; and
second circuitry configured to (i) determine a first frequency offset based on the received preamble and the known preamble, (ii) determine a second frequency offset based on the received preamble and the known preamble, and (iii) process at least a portion of the received wireless communication signal based on the first frequency offset and the second frequency offset,
wherein the first frequency offset is based on a multi-chip-level differential frequency offset acquisition that uses two or more chips associated with the received preamble, and wherein the second frequency offset is based on a symbol-level differential frequency offset acquisition that uses two or more symbols associated with the received preamble, wherein each of the two or more symbols are encoded by two or more chips.

10. The apparatus of claim 9, wherein the second circuitry is configured to perform a first differential detection based on a first differential distance to determine the first frequency offset, wherein the second circuitry is configured to perform a second differential detection based on a second differential distance to determine the second frequency offset, wherein the first differential distance is greater than one chip but less than a full symbol length, and wherein the second differential distance is greater than the first differential distance.

11. The apparatus of claim 9, wherein the second frequency offset is based on the first frequency offset.

12. The apparatus of claim 9, wherein the second circuitry is configured to determine an additional frequency offset based on the received preamble and use the additional frequency offset in addition with the first frequency offset and the second frequency offset to process the at least the portion of the received wireless communication signal.

13. The apparatus of claim 9, wherein the first frequency offset is determined based on (i) an output of a first differential detection that uses at least a portion of samples corresponding to the received preamble and a first differential distance to produce first differential output values, and (ii) an output of a first correlation that uses (a) values corresponding to at least a portion of the known preamble and (b) at least a portion of the first differential output values, and wherein the second frequency offset is determined based on (i) an output of a second differential detection that uses at least a portion of the samples and a second, greater differential distance to produce second differential output values, and (ii) an output of a second correlation based on (a) values corresponding to at least a portion of the known preamble and (b) at least a portion of the second differential output values.

14. The apparatus of claim 13, wherein the second circuitry is configured to (i) perform a maximum search based on the output of the first correlation, and (ii) determine a sample time index based on the maximum search, and (iii) access a value that corresponds to the sample time index to determine the second frequency offset, the value being included in the output of the second correlation.

15. The apparatus of claim 9, wherein the known preamble comprises a sequence of zeros.

16. The apparatus of claim 9, wherein the spreading sequence is a Direct Sequence Spread Spectrum (DSSS) spreading sequence.

17. A system comprising:
transceiver electronics configured to receive a wireless communication signal; and
processor electronics coupled with the transceiver electronics, configured to perform operations comprising:
determining a coarse frequency offset based on a received preamble of the wireless communication signal and a known preamble, the received preamble having been generated based on a spreading sequence and the known preamble;
determining a fine frequency offset based on the received preamble and the known preamble; and
processing at least a portion of the wireless communication signal based on the coarse frequency offset and the fine frequency offset,
wherein determining the coarse frequency offset comprises performing a multi-chip-level differential frequency offset acquisition that uses two or more chips associated with the received preamble, and wherein determining the fine frequency offset comprises performing a symbol-level differential frequency offset acquisition that uses two or more symbols associated with the received preamble, wherein each of the two or more symbols are encoded by two or more chips.

18. The system of claim 17, wherein determining the coarse frequency offset comprises performing a first differential detection based on a first differential distance, and wherein determining the fine frequency offset comprises performing a second differential detection based on a second differential distance, wherein the first differential distance is greater than one chip but less than a full symbol length, and wherein the second differential distance is greater than the first differential distance.

19. The system of claim 17, wherein the fine frequency offset is based on the coarse frequency offset.

20. The system of claim 17, wherein the operations comprise:

determining an additional frequency offset based on the received preamble, wherein the additional frequency offset is different from the coarse frequency offset and the fine frequency offset, and wherein the processing comprises using the coarse frequency offset, the fine frequency offset, and the additional frequency offset.

21. The system of claim 17, wherein determining the coarse frequency offset comprises (i) performing a first differential detection based on at least a portion of samples corresponding to the received preamble using a first differential distance to produce first differential output values, and (ii) performing a first correlation based on (a) values corresponding to at least a portion of the known preamble and (b) at least a portion of the first differential output values, and wherein determining the fine frequency offset comprises (i) performing a second differential detection based on at least a portion of the samples using a second, greater differential distance to produce second differential output values, and (ii) performing a second correlation based on (a) values corresponding to at least a portion of the known preamble and (b) at least a portion of the second differential output values.

22. The system of claim 21, wherein determining the coarse frequency offset comprises (i) performing a maximum search based on output values of the first correlation, and (ii) determining a sample time index based on the maximum search, and wherein determining the fine frequency offset comprises using the sample time index to access a value that is based on an output of the second correlation.

23. The system of claim 17, wherein the known preamble comprises a sequence of zeros.

24. The system of claim 17, wherein the spreading sequence is a Direct Sequence Spread Spectrum (DSSS) spreading sequence.

* * * * *